United States Patent [19]
Couture

[11] 4,411,050
[45] Oct. 25, 1983

[54] JEWELRY CLASP

[76] Inventor: Guy Couture, 21 St. Paul St., Ste. Brigitte de Laval, Canada, G0A 3K0

[21] Appl. No.: 405,944

[22] Filed: Aug. 6, 1982

[30] Foreign Application Priority Data

Aug. 24, 1981 [CA] Canada .................................. 384472

[51] Int. Cl.³ ............................................ A44B 13/02
[52] U.S. Cl. ................................ 24/234; 24/201 HE; 24/225; 24/232 R; 63/4
[58] Field of Search ..................... 24/234, 233, 232 R, 24/201 HE, 225, 376; 63/4

[56] References Cited

U.S. PATENT DOCUMENTS

| | | | |
|---|---|---|---|
| 285,956 | 10/1883 | Bassford et al. | 24/233 |
| 720,843 | 2/1903 | Peters | 24/234 |
| 1,584,307 | 5/1926 | King | 24/234 |
| 2,234,853 | 11/1941 | Brueggeman | 24/234 |
| 2,795,024 | 6/1957 | Donaldson | 24/376 |
| 3,545,049 | 8/1970 | Brueggeman | 24/236 |

FOREIGN PATENT DOCUMENTS

| | | | |
|---|---|---|---|
| 1038179 | 9/1978 | Canada | 24/233 |
| 1047268 | 1/1979 | Canada | 24/233 |

*Primary Examiner*—John J. Wilson

[57] ABSTRACT

This invention is related to a clasp used in jewelry. The clasp includes a first element having a main body and a jaw in the shape of a hook which is integrally formed with the main body; a second element, also having a main body and a jaw in the shape of a hook which is integrally formed with its main body. The jaws of both the first and second elements are tapered, one to the left and the other to the right, thereby mutually lapping each other. A rod and a spring are provided to pivot the bodies of the first and second elements relative to one another, such that the tapered surfaces of the jaws form contacting faces.

4 Claims, 8 Drawing Figures

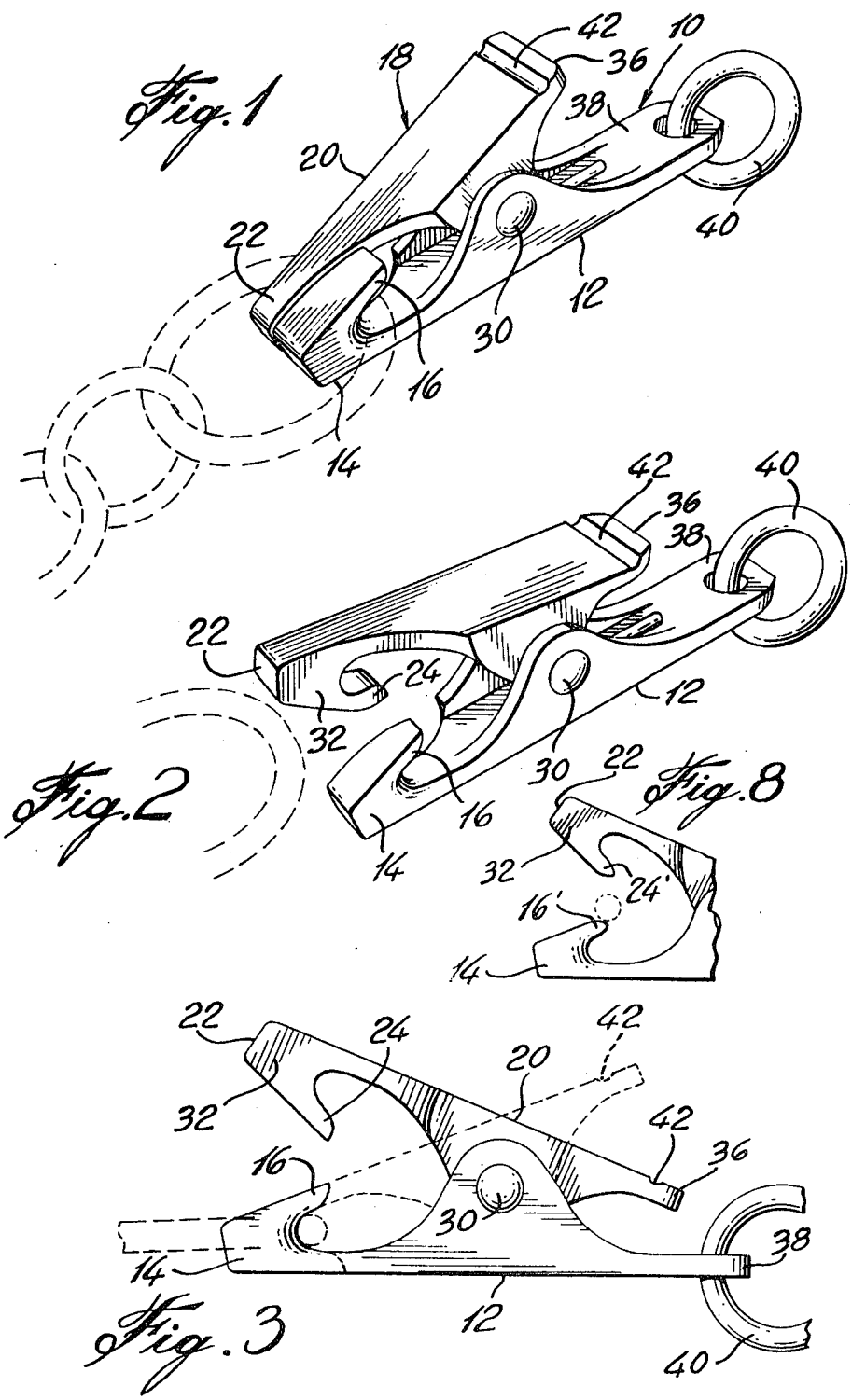

JEWELRY CLASP

FIELD OF THE INVENTION

The present invention relates generally to clasps, more specifically to a miniature clasp of the type adapted to attach small chains for wearing jewelry.

BACKGROUND OF THE INVENTION

It is well known in the art of jewelry-making to attach the two ends of a small chain worn around the neck or arms by means of a clasp. Such clasps are also used to attach security chains to jewelry.

The clasp which is most known and used commercially comprises a hollow ring in which is mounted a plunger which slides inside the ring and is biased by means of a spring, also located inside the ring, to close a small open arc formed in the ring. This kind of clasp, however, has major disadvantages. For example, the plunger and the spring, which are located inside the ring, do not receive sufficient ventilation and corrode easily due to the humidity of the skin. The ring itself is also subject to be easily flattened or twisted out of shape. The result is that the plunger becomes stuck and the clasp stays half or fully open, leading possibly to the loss of a valuable piece of jewelry.

Another type of clasp used in jewelry has the form of pincers having a jaw provided with several pairs of teeth which overlap each other to partially surround the ring at the end of the chain. This ring can easily be caught in a single pair of teeth and, if too much tension is applied to the chain, the pair of teeth may break.

OBJECT OF THE INVENTION

Accordingly, it is the object of this invention to provide a jewelry clasp which is completely safe and whose constituent parts are well exposed to air, thereby not corroding easily.

SUMMARY OF THE INVENTION

The above and other objects and advantages of the present invention are realized according to a preferred embodiment comprising a first element having a main body and a jaw in the form of a hook which is integrally formed with the main body of this first element, and a second element, also having a main body and a jaw in the form of a hook integrally formed with the main body of the second element. The jaws of both the first and second elements are tapered: one to the left and the other to the right, thereby mutually lapping each other. Means are provided to pivot the main bodies relative to each other, such that the tapered surfaces of the jaws define contacting faces. A spring means is provided to bias the jaws of the first and second elements into movement towards each other.

The interior portion of the hook of each jaw has a radius of curvature corresponding to the radius of curvature of a ring normally provided at one end of small jewelry chains, and the width of each of the jaws is sufficient to receive a substantial portion of the circumference of the ring. Such construction prevents the deformation of the ring as well as breakage of the jaws when excessive tension is applied to the ring and also prevents wearing-out of the latter.

The cavity formed by the hooks of the jaw is of such construction that the hooks surround opposite surfaces of the ring in taut configuration of the chain, thus preventing the opening of the clasp in such configuration. The clasp is therefore very safe.

In accordance with a preferred embodiment, the tip of each hook is externally rounded, such that the jaws will automatically close even if the ring is already retained under tension by one of the hooks.

BRIEF DESCRIPTION OF THE DRAWINGS

The above will be clearly understood by having referral to the preferred embodiment of the invention, illustrated by the accompanying drawings, in which:

FIG. 1 is a perspective view of the clasp according to a first embodiment of the invention in closed configuration;

FIG. 2 is a perspective view of the clasp of FIG. 1, in open configuration;

FIG. 3 is a side view of the clasp of FIG. 2 showing a ring inserted in the jaws;

FIG. 8 is a side elevation of the front portion of the clasp in open configuration and modified in accordance with a second and preferred embodiment.

Like numerals refer to like elements throughout the drawings.

DETAILED DESCRIPTION OF THE PREFERRED EMBODIMENT

Figure 5:
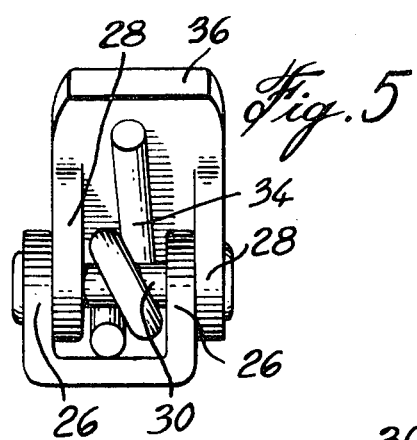
FIG. 5 is a rear elevation of the clasp.
Figure 6:
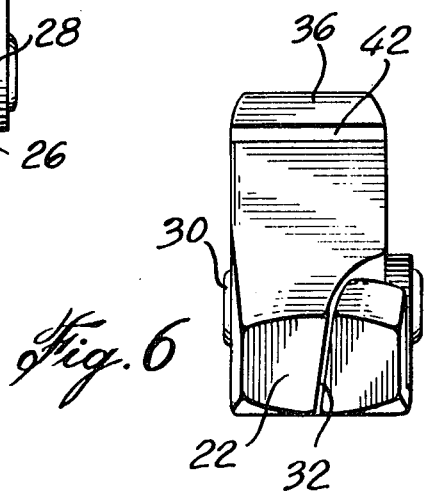
FIG. 6 is a front elevation of the clasp.

Referring to the drawings, the clasp comprises a first elongated planar, element 10 having a main central body 12 and a jaw 14 at one end defining a hook 16; and a second similar elongated, planer, element 18 having a main central body 20, as well as a jaw 22 at one end defining a hook 24. The main body of each element 10 and 18 has a cross-sectional U-shape and the legs 26 of main body 12 lap the legs 28 of main body 20, one being interiorly located and the other exteriorly, as clearly shown in FIG. 5 of the drawings. A rod 30 extends through the legs of the two elements and functions as a pivot in the clasp assembly. The jaws of the elements are tapered, one leftwardly and the other rightwardly, such that they can lap each other and define contact surfaces 32 in a plane which is inclined relative to the axis of rod 30. A spring 34 is mounted on rod 30 to bias the jaws into closing relationship at their respective contact surfaces 32. Spring 34 is of a spiral shape, being inserted between one leg 26 and one leg 28 of the elements 10 and 18, respectively, to prevent the legs from sliding laterally on rod 30.

It is to be noted that jaws 14 and 22 are tapered so that, when in closed lapped configuration, the sum of their widths does not exceed the maximum width of the clasp.

Figure 4:
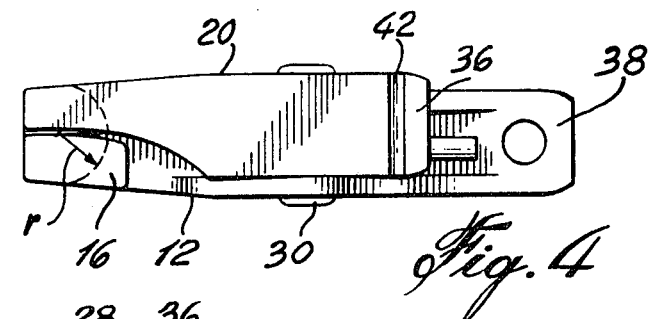
FIG. 4 is a top plan view of the clasp.
Figure 7:
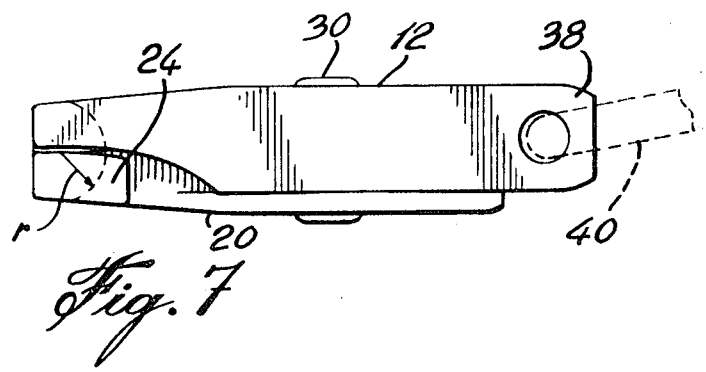
FIG. 7 is a bottom plan view of the clasp.

Referring now specifically to FIGS. 4 and 7 of the drawings, the inner ring contacting surfaces of hooks 16 and 24 are each concavely rounded in a plane perpendicular to pivot rod 30, thus forming a circular arc having a radius of curvature which corresponds with that of the cross-section of rings normally used in jewelry chains. Moreover, these ring contacting surfaces are convexly rounded in the plane containing said pivot rod and have a radius of curvature substantially equal to that of the inner circumference of said ring. Finally, the width of each jaw 14 and 22 is such that the jaws surround a substantial portion of the chain ring. Also, the web portion of each hook is much thicker than the tip of said hook. This design effectively prevents the deformation of the ring or of the jaws even if substantial tension is applied to the chain considering that the clasp is normally made of malleable precious metal, such as gold.

The cavity formed by closed hooks 16 and 24 is of such dimension so as to completely surround the ring when the chain is taut. In this manner, the clasp cannot open by itself because the two hooks 16 and 24 surround opposite surfaces of the ring. To open the clasp, it is thus necessary to push the ring out of the cavities formed by the hooks 16 and 24.

Elements 10 and 18 are provided with rearwardly-extending projections 36 and 38, which are used to open the clasp and disengage the ring as illustrated in FIGS. 2 and 3. Projection 38 is longer than projection 36 to allow attachment of another ring 40. The latter attaches the clasp to the other end of the chain without obstructing the movement of projection 36. The latter is formed with a small slot 42 adapted to receive a fingernail to facilitate the opening movement of the clasp.

Referring finally to FIG. 8 of the drawings, there is shown a refinement of the clasp as described above; instead of having a straight outside surface at the tip of hooks 16 and 24, the outside surface is substantially rounded, as shown by the tips of hooks 16' and 24' of FIG. 8. Such particular construction obviates the need to push the ring out of the cavity formed by the hooks to close the clasp. Thus, when the ring is already inserted in one of the hooks, it will slide of itself on the rounded exterior surface at the tip of the other hook 16' or 24' when the latter is biased into closing position by spring 34. This other hook can thus close automatically without having to push the ring towards projections 36 or 38.

Although the invention has been described in terms of the above-preferred embodiment, it is to be understood that variations thereof are also envisioned, as set forth in the appended claims.

What I claim is:

1. A jewelry clasp to removably attach a ring of a jewelry chain, comprising a pair of similar elongated planar elements extending opposite each other in the same general direction, each of which has a jaw at one end, a central body portion and a flat projection at its other end, said central body portion being of U-shape cross-section defining a pair of flat side legs projecting at right angles to the planar element and in transverse register, the legs of one of said elements directed towards and lapping the legs of the other element, a pivot rod extending through said legs transversely of said clasp, each jaw forming an integral hook, of U-shape cross-section, defining a web portion and a free tip, said hooks directed towards each other with their tip directed towards said pivot rod, said hooks taking a closed position upon relative pivotal movement of said elements about said pivot rod in a direction in which said jaws move towards each other, said hooks in said closed position lapping each other at a respective contact surface, which is inclined relative to said pivot rod, both hooks, when in closed position, defining a substantially continuous inside ring contact surface which, in a plane containing the longitudinal axis of said rod, is convex and has a radius of curvature substantially equal to the radius of curvature of the inside circumference of said ring, and a length sufficient to contact a substantial portion of the inside circumference of said ring, said inside ring contact surface, in a plane perpendicular to said axis of said pivot rod, being concave with a radius of curvature substantially equal to the radius of curvature of the cross-section of said ring, whereby said ring is contacted by said ring contact surface of said closed hooks over a substantial portion of its cross-section and, when taut, prevents opening of said hooks, the thickness of said web being much greater than the thickness of said tips to prevent deformation of the latter under stress, even when said clasp is made of a malleable precious metal, such as gold, a spring biasing said hooks in closed position, said spring including a central coiled portion surrounding said pivot rod between said legs, said flat projections providing finger actuated means for opening said hooks against the bias of said spring, one of said projections being longer than the other projection and having means to attach another jewelry chain ring.

2. A jewelry clasp as defined in claim 1, wherein one leg of one pair if located interiorly and the other leg of said one pair is located exteriorly relative to the legs of the other pair, and the central coiled portion of said spring acts as a spacer for said interiorly-located legs.

3. A jewelry clasp as defined in claim 2, wherein the shorter one of said projections is provided with a transverse slot at its external surface for the insertion of a finger-nail.

4. A jewelry clasp as claimed in claim 1, wherein each tip has a rounded exterior face whereby said hooks close automatically even when said ring is already inserted into either one of said hooks.

* * * * *